(12) United States Patent
Würthner et al.

(10) Patent No.: US 6,221,114 B1
(45) Date of Patent: Apr. 24, 2001

(54) COLORANT SALTS AND THEIR USE IN DYEING POLYMERIC MATERIAL

(75) Inventors: Frank Würthner, Ulm; Rüdiger Sens, Ludwigshafen; Günther Seybold, Neuhofen; Karl-Heinz Etzbach, Frankenthal, all of (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 09/380,620

(22) PCT Filed: Mar. 9, 1998

(86) PCT No.: PCT/EP98/01356

§ 371 Date: Sep. 17, 1999

§ 102(e) Date: Sep. 17, 1999

(87) PCT Pub. No.: WO98/41583

PCT Pub. Date: Sep. 24, 1998

(30) Foreign Application Priority Data

Mar. 19, 1997 (DE) ................................ 197 11 445

(51) Int. Cl.[7] .......................... C08B 69/02; C08B 47/62; C08B 67/00; C09D 11/00
(52) U.S. Cl. .................. 8/661; 8/680; 8/681; 8/685; 8/687; 8/919; 546/49; 552/210; 540/133; 540/139
(58) Field of Search ................. 8/661, 919, 680, 8/681, 687, 685; 540/133, 139; 552/210; 546/49

(56) References Cited

U.S. PATENT DOCUMENTS

| | | | |
|---|---|---|---|
| 3,325,511 | * | 6/1967 | Lesslie et al. . |
| 3,334,116 | * | 8/1967 | Bryan et al. . |
| 4,033,980 | | 7/1977 | Meininger et al. . |
| 4,213,757 | * | 7/1980 | Ruske et al. . |
| 4,397,649 | | 8/1983 | Springer . |
| 5,000,756 | * | 3/1991 | Aeschlimann . |
| 5,482,546 | | 1/1996 | Eida . |
| 5,542,972 | | 8/1996 | Von Der Eltz et al. . |
| 5,760,215 | * | 6/1998 | Gisler et al. . |

FOREIGN PATENT DOCUMENTS

| | | |
|---|---|---|
| 44 17 718 | 11/1995 | (DE) . |
| 0 024 677 | 3/1981 | (EP) . |
| 0 093 331 | 11/1983 | (EP) . |
| 0 559 309 | 9/1993 | (EP) . |

OTHER PUBLICATIONS

B. Smith, et al., Chem. Color, vol. 19, No. 8, pp. 23–29, "Ink Jet Printing for Textiles," Aug. 1987.

L.A. Graham, Chem. Color, vol. 21, No. 6, pp. 27–32, "Ink Jet Systems for Dyeing and Printing of Textiles," Jun. 1989.

* cited by examiner

Primary Examiner—Margaret Einsmann
(74) Attorney, Agent, or Firm—Oblon, Spivak, McClelland, Maier & Neustadt, P.C.

(57) ABSTRACT

Dye salts which are free from fiber-reactive radicals and have the formula

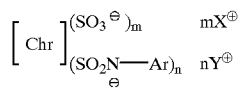

where Chr is an (m+n)-valent radical of a chromophore from the series of the metal-free or metal-containing phthalocyanines, of the quinacridones, of the mono-, dis- or polyazo dyes, of the anthraquinones or copper formazans, Ar is phenyl or naphthyl each of which is unsubstituted or substituted, $x^{\oplus}$ is a metal cation or ammonium ion, $y^{\oplus}$ is a proton, metal cation or ammonium ion, m is 1 to 6 and n is 1 to 6, the sum of m and n being not more than 7, are used in methods of dyeing or printing polymeric material and in dye preparations.

6 Claims, No Drawings

COLORANT SALTS AND THEIR USE IN DYEING POLYMERIC MATERIAL

BACKGROUND OF THE INVENTION

FIELD OF THE INVENTION

The present invention relates to novel dye salts which are free from fiber-reactive radicals and have the formula I

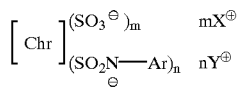

where
- Chr is an (m+n)-valent radical of a chromophore from the series of the metal-free or metal-containing phthalocyanines, of the quinacridones, of the mono-, dis- or polyazo dyes, of the anthraquinones or copper formazans,
- Ar is phenyl or naphthyl each of which is unsubstituted or substituted,
- $X^\oplus$ is a metal cation or ammonium ion,
- $Y^\oplus$ is a proton, metal cation or ammonium ion,
- m is 1 to 6, and
- n is 1 to 6, the sum of m and n being not more than 7, to a method of dyeing or printing paper and to dye preparations comprising dye salts.

SUMMARY OF THE INVENTION

It is an object of the present invention to provide novel dye salts which are suitable advantageously for dyeing or printing polymeric materials, especially paper, both in the pulp and by means of the inkjet process. These novel dye salts should feature advantageous performance properties, in particular a good fastness to water and to light.

We have found that this object is achieved by the dye salts of the formula I defined at the outset.

DETAILED DESCRIPTION OF THE PREFERRED EMBODIMENTS

The dye salts of the formula I are free from fiber-reactive radicals. In other words, they do not carry any of the radicals which are customary in reactive dyes and which react, for example, additively or substitutively with the hydroxyls of cellulose.

All alkyls appearing in the formulae specified herein can be either straight-chain or branched.

Any substituted phenyls or naphthyls in the formulae specified herein generally have 1 to 3, preferably 1 or 2, substituents which are, for example, $C_1$–$C_6$-alkyl, $C_1$–$C_6$-alkoxy, halogen, cyano, nitro, $C_1$–$C_6$-alkoxycarbonyl, $C_1$–$C_6$-alkylsulfonyl or $C_1$–$C_6$-alkoxysulfonyl.

Examples of alkyls occurring in this application are methyl, ethyl, propyl, isopropyl, butyl, isobutyl, sec-butyl, tert-butyl, pentyl, isopentyl, neopentyl, tert-pentyl, hexyl, 2-methylpentyl, heptyl, octyl, 2-ethylhexyl, isooctyl, nonyl, isononyl, decyl, isodecyl, undecyl, dodecyl, tridecyl, isotridecyl, tetradecyl, pentadecyl, hexadecyl, heptadecyl, octadecyl, nonadecyl, eicosyl (the terms isooctyl, isononyl, isodecyl and isotridecyl are trivial names and derived from the alcohols obtained by oxo synthesis; cf. in this respect Ullmann's Encyclopedia of Industrial Chemistry, 5$^{th}$ Edition, Vol. A 1, pages 290 to 293, and also Vol. A 10, pages 284 and 285), 2-methoxyethyl, 2-ethoxyethyl, 2-propoxyethyl, 2-isopropoxyethyl, 2-butoxyethyl, 2- or 3-methoxypropyl, 2- or 3-ethoxypropyl, 2- or 3-propoxypropyl, 2- or 3-butoxypropyl, 2- or 4-methoxybutyl, 2- or 4-ethoxybutyl, 2- or 4-propoxybutyl, 2- or 4-butoxybutyl, 3,6-dioxaheptyl, 3,6-dioxaoctyl, 4,8-dioxanonyl, 3,7-dioxaoctyl, 3,7-dioxanonyl, 4,7-dioxaoctyl, 4,7-dioxanonyl, 4,8-dioxadecyl, 3,6,8-trioxadecyl, 3,6,9-trioxaundecyl, 3,6,9,12-tetraoxatridecyl, 3,6,9,12-tetraoxatetradecyl, 2-hydroxyethyl, 2- or 3-hydroxypropyl or 2- or 4-hydroxybutyl.

Examples of alkoxys are methoxy, ethoxy, propoxy, isopropoxy, butoxy, isobutoxy, sec-butoxy, pentyloxy, isopentyloxy, neopentyloxy, tert-pentyloxy, hexyloxy or 2-methylpentyloxy.

Halogen is fluorine, chlorine or bromine, for example.

Examples of alkoxycarbonyls are methoxycarbonyl, ethoxycarbonyl, propoxycarbonyl, isopropoxycarbonyl, butoxycarbonyl, isobutoxycarbonyl, sec-butoxycarbonyl, pentyloxycarbonyl, isopentyloxycarbonyl, neopentyloxycarbonyl or hexyloxycarbonyl.

Examples of alkyl- and alkoxysulfonyls are methyl-, ethyl-, propyl-, isopropyl-, butyl-, isobutyl-, pentyl-, hexyl-, methoxy-, ethoxy-, propoxy-, isopropoxy-, butoxy-, isobutoxy-, pentyloxy- or hexyloxysulfonyl.

Particular examples of Ar are phenyl, 2-, 3- or 4-methylphenyl, 2-, 3- or 4-ethylphenyl, 2-, 3- or 4-propylphenyl, 2-, 3- or 4-isopropylphenyl, 2-, 3- or 4-butylphenyl, 2,3-, 2,4- or 2,6-dimethylphenyl, 2-, 3- or 4-methoxyphenyl, 2-, 3- or 4-ethoxyphenyl, 2,3-, 2,4- or 2,6-dimethoxyphenyl, 2-, 3- or 4-fluorophenyl, 2-, 3- or 4-chlorophenyl, 2-, 3- or 4-bromophenyl, 2-, 3- or 4-nitrophenyl or 2-, 3- or 4-cyanophenyl.

$X^\oplus$ and $Y^\oplus$ can each be a metal cation or an ammonium ion.

Particularly suitable metal cations are the lithium, sodium and potassium ions.

For the purposes of the invention ammonium ions are substituted or unsubstituted. Examples of substituted ammonium ions are monoalkyl-, dialkyl-, trialkyl-, tetraalkyl- or benzyltrialkylammonium ions or those cations which are derived from nitrogen-containing 5- or 6-membered saturated heterocycles, such as pyrrolidinium, piperidinium, morpholinium or piperazinium cations or their N-monoalkyl- or N,N-dialkyl-substituted products. Alkyl here is generally straight-chain or branched $C_1$–$C_{20}$-alkyl which can in general be substituted by 1 or 2 hydroxyls and/or interrupted by 1 to 4, preferably 1 or 2, oxygens in ether function. Where the ammonium ions have two or more alkyls, the latter can be identical or different.

Ions deserving of particular mention are mono-$C_1$–$C_6$-alkylammonium, di-($C_1$–$C_6$-alkyl)ammonium, tri-($C_1$–$C_6$-alkyl)ammonium, tetra-($C_1$–$C_6$-alkyl)ammonium, benzyltri-($C_1$–$C_6$-alkyl)ammonium, pyrrolidinium, piperidinium, morpholinium, piperazinium or N-($C_1$–$C_4$-alkyl)piperazinium ions.

Examples of suitable amines from which the ammonium ions are derived are:
- monoalkylamines, such as methylamine, ethylamine, propylamine, isopropylamine, butylamine, sec-butylamine, isobutylamin, 1,2-dimethylpropylamine or 2-ethylhexylamine,
- dialkylamines, such as dimethylamine, diethylamine, dipropylamine, diisopropylamine, dibutylamine, diisobutylamine, di-sec-butylamine, bis(2-ethylhexyl) amine, N-methyl-n-butylamine or N-ethyl-n-butylamine, alkoxyalkylamines, such as 2-methoxyethylamine, bis(2-methoxyethyl)amine, 3-methoxypropylamine, 3-ethoxypropylamine or 3-(2-ethylhexoxy) propylamine, trialkylamines, such as trimethylamine, triethylamine, tripropylamine, tributylamine, N,N-dimethylethylamine, N,N-dimethylisopropylamine, N,N-dimethylbenzylamine and hydroxy amines, such as mono- or diethanolamine, mono- or dipropanolamine, mono- or diisopropanolamine, N-mono- or N,N-di-($C_1$–$C_4$-alkyl)ethanolamines, -propanolamines or -isopropanolamines, such as N-mono- or N,N-dimethylethanolamine, -propanolamine or -isopropanolamine, N-mono- or N,N-diethylethanolamine, -propanolamine or -isopropanolamine, N-mono- or N,N-dipropylethanolamine, -propanolamine or -isopropanolamine, N-mono- or N,N-diisopropylethanolamine, -propanolamine or -isopropanolamine or N-mono- or N,N-dibutylethanolamine, -propanolamine or -isopropanolamine, N-($C_1$–$C_4$-alkyl)diethanolamines, -dipropanolamines or -diisopropanolamines, such as N-methyldiethanolamine, -dipropanolamine or -diisopropanolamine, N-ethyldiethanolamine, -dipropanolamine or -diisopropanolamine, N-propyldiethanolamine, -dipropanolamine or -diisopropanolamine, N-isopropyldiethanolamine, -dipropanolamine or -diisopropanolamine or N-butyldiethanolamine, -dipropanolamine or -diisopropanolamine, triethanolamine, tripropanolamine, triisopropanolamine, N-(2-hydroxyethyl)pyrrolidine, N-(2- or 3-hydroxypropyl) pyrrolidine, N-(2-hydroxyethyl)piperidine, N-(2- or 3-hydroxypropyl)piperidine, N-(2-hydroxyethyl) morpholine, N-(2- or 3-hydroxypropyl)morpholine, N-(2-hydroxyethyl)piperazine, N-(2- or 3-hydroxypropyl)piperazine or N,N-dimethyl- or N,N-diethyl-N-(5-hydroxy-3-oxapentyl)amine.

Appropriate chromophore radicals are derived in particular from the series of the metal-free phthalocyanines or of the phthalocyanines whose central unit is copper, zinc, nickel, AlCl or vCl, particular emphasis being placed on copper phthalocyanine.

The phthalocyanines preferably carry no substituents in their structure.

If Chr is the radical of a chromophore from the series of the metal-free or metal-containing phthalocyanines, m is preferably 1 to 2 and n is preferably 2 to 3, the sum of m and n being not more than 4.

Preference is given to dye salts of the formula I in which Ar is phenyl which is unsubstituted or substituted by $C_1$–$C_6$-alkyl, $C_1$–$C_6$-alkoxy, cyano or nitro.

The novel dye salts of the formula I can be obtained by methods known per se.

For example, a sulfonyl halide of the formula II

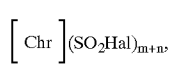 (II)

where

Hal is halogen, especially chlorine, and Chr, m and n are each as defined above, is treated first with an arylamine of the formula III Ar—$NH_2$ (III), where Ar is as defined above, and then with a base comprising the metal ions or ammonium ions ($X^⊕$/$Y^⊕$).

The resulting aqueous solution, which is advantageously adjusted to a pH of from 8 to 12, is ready for use immediately after filtration or centrifugation.

The dye salts of formula I are suitable advantageously for dyeing polymeric material.

The present invention therefore also provides a method of dyeing or printing polymeric material using dye salts of the formula Ia

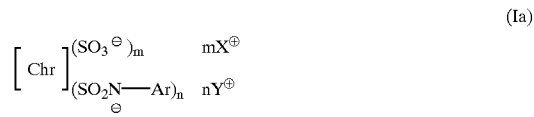 (Ia)

where

Chr is an (m+n)-valent radical of a chromophore from the series of the metal-free or metal-containing phthalocyanines, of the quinacridones, of the mono-, dis- or polyazo dyes, of the anthraquinones or copper formazans, Ar is phenyl or naphthyl each of which is unsubstituted or substituted, $X^⊕$ is a metal cation or ammonium ion, $y^⊕$ is a proton, metal cation or ammonium ion, m is 1 to 6 and n is 1 to 6, the sum of m and n being not more than 7, where preference is given to the use of those dye salts of the formula Ia which are free from fiber-reactive radicals.

Preferred embodiments of the novel method employ the preferred dye salts defined above.

The novel method is, with particular advantage, implemented with aqueous solutions of the dye salts Ia which solutions have a pH of from 6 to 12, preferably from 8 to 11, especially about 10, and which, based in each case on their overall weight, contain from 1 to 10% by weight, preferably from 2 to 4% by weight of one or more dye salts of the formula Ia with from 80 to 99% by weight, preferably from 90 to 99% by weight, of water. Examples of other possible constituents are diluents. Obviously, the sum of the constituents of the solution is 100% by weight.

The present invention also provides preparations comprising one or more dyestuffs of the formula I and water, especially in the abovementioned proportion by weight.

Further possible constituents of the aqueous preparations are salts and customary additives.

Suitable polymeric materials which can be dyed or printed in accordance with the invention are, in particular, paper pulps, and also cellulose, cotton, leather, bast fibers, hemp, flax, sisal, jute, coconut or straw.

The dyeing or printing of paper is preferred, especially the dyeing of paper in the pulp and the printing of paper by means of the inkjet printing process.

The pulp dyeing of paper is preferably deployed with sized or unsized paper.

In the inkjet printing process the inks used are usually aqueous inks which are sprayed in small droplets directly onto the substrate. A distinction is made here between a continuous process, in which the ink is pressed uniformly through a nozzle and is guided onto the substrate by means of an electric field depending on the pattern to be printed, and an interrupted inkjet, or drop-on-demand, process, in which the ejection of ink takes place only where a colored dot is to be placed. In the latter process, pressure is exerted on the ink system by means of a piezoelectric crystal or a heated hollow needle (bubble jet or therma jet technique) and so one drop of ink is expelled. Such procedures are described, for example, in Text. Chem. Color 19 (8), 1987, 23 to 29, and 21 (6), 1989, 27 to 32.

The use of the novel dye salts has the advantage that they are soluble in water in the basic range (no dispersing problems) and after spraying onto neutral or acidic papers exhibit good fastness to water and light in the printed image.

The dyed and printed papers, which feature good bleachability, are wetfast not only to water but also to milk, soapy water, sodium chloride solutions, fruit juices or sweetened mineral waters and, because of their good alcohol fastness, are resistant to alcoholic drinks as well.

The examples which follow are intended to illustrate the invention.

A) PREPARATION

EXAMPLE 1

23 g of copper phthalocyanine tetrasulfonyl chloride were added as a paste (solids content: 38%) at 0° C. to 30 g of ice/water (1:1 w/w). The mixture was dispersed for 30 minutes. Then 3.72 g (0.04 mol) of aniline were added at 0° C. with stirring and a pH of 7 was established by adding sodium bicarbonate. Stirring was continued for 1 h, a pH of from 9.2 to 9.3 was then established with 25% strength by weight aqueous ammonia solution, and the resulting mixture was heated to 25° C. Following the addition of 3.3 g of sodium acetate the mixture was stirred at 25° C. for 1 h, during which a pH of 8.4 was established. Then, after adding small amounts of a customary commercial antifoam, the mixture was stirred at 50 to 52° C. for 2 h (pH: 8.4) and then a pH of from 10.7 to 10.9 was established with 50% strength by weight sodium hydroxide solution. After overnight stirring, 100 ml of water and the amount of 50% strength by weight sodium hydroxide solution required to give a pH of 12 were added. The mixture was stirred for 1 h and filtered and the filtrate, whose pH was 10.3, was acidified with concentrated hydrochloric acid to a pH of 1. A precipitate was formed, which was dried to give 3.6 g of a powder. In aqueous solution (above a pH of 10) this powder has the following structure:

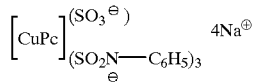

EXAMPLE 2

The following dye salt was prepared analogously.

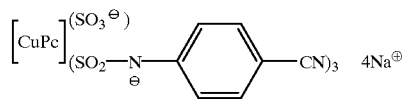

B) PREPARATION OF INKJET PRINTS ON PAPER

Ink: 0.3 g of dye salt is stirred at room temperature into 9.7 g of a solution of water and N-methylpyrrolidone (9:1 v/v) for 2 h (magnetic stirrer). The solution is then rendered alkaline with base. Any residue is removed by centrifuging.

Ink 1 base: sodium hydroxide solution
Ink 2 base: aqueous ammonia solution

The prints were prepared with a customary commercial inkjet printer from Hewlett-Packard (HP 500) on the following commercial papers:
a) Intercopy paper (IC)
b) Claire Fontaine paper (CF)
c) Inkjet paper from Zweckform (ZF)
d) Coated paper from Epson (EP)

After drying for 24 h the prints were subjected to the following tests:

Light fastness: the light fastness is determined by exposing a print in an original Heraeus suntest apparatus and determining the percentage decrease in depth of color over time. (The result is given as the number of hours after which the measured optical density was x % of its value prior to irradiation.)

Water fastness: the prints are stirred for 5 minutes at 200 rpm in 500 ml of distilled water. The residual staining is indicated as a percentage.

Splash test: a line of text and a printed bar are wetted with 1 drop of water. Ink bleeding is assessed visually and rated 1–3 (1=very good; 2=average; 3=poor).

The results obtained were as follows:

| Dye No. | Ink No. | pH of the ink | Paper | $\lambda_{max}$ [nm] | LF[a] | WF[b] | ST[c] |
|---|---|---|---|---|---|---|---|
| 1 | 1 | 10.8 | IC | 667 | 215 h/82% | 71% | 1− |
| 1 | 1 | 10.8 | CF | 668 | 215 h/93% | 67% | |
| 1 | 2 | 10.8 | IC | 669 | 214 h/86% | 86% | 2 |
| 1 | 2 | 10.8 | CF | 609 | 214 h/92% | 94% | 1− |
| 2 | 1 | 9.5 | IC | 671 | 217 h/93% | 73% | 2 |
| 2 | 1 | 9.5 | CF | 608 | 217 h/94% | 73% | 2− |
| 2 | 2 | 9.5 | IC | 608 | 217 h/92% | 67% | 2 |
| 2 | 2 | 9.5 | CF | 611 | 217 h/95% | 80% | 2− |
| 2 | 2 | 9.5 | EP | 612 | 217 h/89% | 98% | 1 |
| 2 | 2 | 9.5 | ZW | 611 | 214 h/90% | 100% | 1 |

[a]LF = light fastness
[b]WF = water fastness
[c]ST = splash test

What is claimed is:
1. A dye salt which is free from fiber-reactive radicals and has formula I:

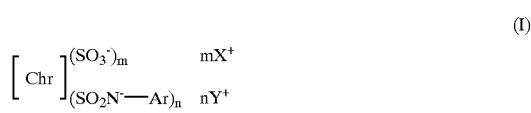

(I)

wherein
Chr is an (m+n)-valent radical of a chromophore from the series of the metal-free or metal-containing phthalcyanines, of the quinacridones, of the mono-, dis- or polyazo dyes, of the anthraquinones or copper formazans;

Ar is phenyl or phenyl substituted by $C_1$–$C_6$-alkyl, $C_1$–$C_6$-alkoxy, cyano or nitro;

$X^+$ is a metal cation or ammonium ion;

$Y^+$ is a proton, metal cation or ammonium ion;

m is 1 to 6, and n is 1 to 6, the sum of m and n being not more than 7.

2. A dye salt as claimed in claim 1, wherein Chr is the radical of a chromophore from the series of the metal-free phthalocyanines or of the phthalocyanines whose central unit is copper, zinc, nickel, AlCl or VCl.

3. A dye salt as claimed in claim 1, wherein Chr is a copper phthalocyanine radical.

4. A dye preparation comprising one or more dye salts of the formula I as claimed in claim 1 and water.

5. A method of dyeing or printing polymeric material, which comprises:

dyeing said polymeric material with a dye salt free of fiber-reactive radicals of formula Ia:

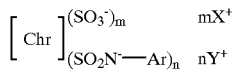
(I)

wherein

Chr is an (m+n)-valent radical of a chromophore from the series of the metal-free or metal-containing phthalcyanines, of the quinacridones, of the mono-, dis- or polyazo dyes, of the anthraquinones or copper formazans;

Ar is phenyl or phenyl substituted by $C_1$–$C_6$-alkyl, $C_1$–$C_6$-alkoxy, cyano or nitro;

$X^+$ is a metal cation or ammonium ion;

$Y^+$ is a proton, metal cation or ammonium ion;

m is 1 to 6, and n is 1 to 6, the sum of m and n being not more than 7.

6. A method as claimed in claim 5, wherein paper is printed with a dye salt Ia by means of the inkjet process.

* * * * *